(12) United States Patent
Deńning et al.

(10) Patent No.: US 7,823,838 B1
(45) Date of Patent: Nov. 2, 2010

(54) AIRCRAFT WITH IMPROVED LIFT

(75) Inventors: Ralph Murch Deńning, Bristol (GB); Clifford Stanley Woodward, Bristol (GB)

(73) Assignee: Rolls-Royce Limited, London (GB)

( * ) Notice: Subject to any disclaimer, the term of this patent is extended or adjusted under 35 U.S.C. 154(b) by 0 days.

(21) Appl. No.: 06/325,359

(22) Filed: Nov. 23, 1981

(30) Foreign Application Priority Data

Nov. 28, 1980 (GB) .................................... 8038248

(51) Int. Cl.
*B64C 3/00* (2006.01)
*B64D 27/00* (2006.01)
(52) U.S. Cl. .................... 244/198; 244/12.5; 244/55
(58) Field of Classification Search ............... 60/230, 60/232; 239/265.35, 265.37, 265.39; 244/12.5, 244/23 D, 204, 212, 215, 217; D12/335
See application file for complete search history.

(56) References Cited

U.S. PATENT DOCUMENTS

| 2,891,740 | A | * | 6/1959 | Campbell ................ 244/12.5 |
| 2,951,660 | A |   | 9/1960 | Giliberty |
| 3,330,500 | A |   | 7/1967 | Winborn |
| 3,332,644 | A | * | 7/1967 | Whittley ................. 244/217 |
| 3,756,542 | A | * | 9/1973 | Bertin .................... 244/212 |
| 4,000,610 | A | * | 1/1977 | Nash et al. ............ 239/265.39 |
| 4,106,730 | A |   | 8/1978 | Spitzer et al. |
| 4,117,996 | A | * | 10/1978 | Sherman ................. 244/215 |
| 4,146,197 | A | * | 3/1979 | Grotz .................... 244/12.5 |
| 4,343,446 | A | * | 8/1982 | Langley .................. D12/335 |

FOREIGN PATENT DOCUMENTS

| DE | 1506615 | * | 8/1969 | ............ 244/215 |
| GB | 1172442 |   | 11/1969 | |
| GB | 1369609 |   | 10/1974 | |
| GB | 1450028 |   | 9/1976 | |

* cited by examiner

*Primary Examiner*—Timothy D Collins
*Assistant Examiner*—Joseph W Sanderson
(74) *Attorney, Agent, or Firm*—Oliff & Berridge, PLC

(57) ABSTRACT

An aircraft has a wing 10 supporting at its underside a gas turbine engine 13. A jet pipe 14 of the engine has an exhaust nozzle 15 of rectangular flow area defined by upper and lower panels 16,17 and end walls 18. The upper panel, which is a part common to the nozzle and to a trailing edge portion of the wing, comprises a pair of flaps 20,21 which are pivotal between a position of alignment with the wing 10 and a position in which they are inclined to the wing. A part of the gas flowing through the jet pipe is diverted through a passage 25 into a passage 26 defined between the flaps 20,21 so as to entrain and accelerate air 26A flowing over the wing 10. This increases the lift of the wing at the rear thereof and also increases the thrust developed at the nozzle 15. This in turn helps to compensate for a nose-up moment on the aircraft arising from the thrust 13D2 of the engine passing forward of the centre of gravity 9A of the aircraft.

6 Claims, 2 Drawing Sheets

AIRCRAFT WITH IMPROVED LIFT

This invention relates to aircraft.

It is known to accelerate the airflow over a wing of an aircraft by discharging compressed air from a duct within the wing over a trailing edge portion of the wing thereby to increase the lift of the wing. The compressed air is derived from a compressor of a gas turbine engine for propelling the aircraft and such an arrangement must necessarily subtract from the power of the engine. It is an object of this invention to reduce or overcome this difficulty.

According to this invention there is provided air-craft comprising a wing, a gas turbine engine, a jet pipe of which has an exhaust end portion situated beneath a trailing edge portion of the wing, a panel constituting a part common to said pipe end portion and said trailing edge portion, and a flow passage arranged to connect the jet pipe to the upper surface of the panel to discharge exhaust gas of the engine over the panel and thereby accelerate air flowing from the wing toward the panel.

Since the invention uses the energy of the exhaust gas to energize the airflow over the wing, it does not subtract power from the engine, at least not to the extent to which this is the case in the above-mentioned known arrangement.

Preferably the exhaust end portion has a rectangular flow area, the longer sides of which lie along the trailing edge of the wing so that said panel forms a significant spanwise part of said edge.

Preferably there are provided two said panels arranged one above the other and said flow passage is arranged for the gas to discharge into a passage defined between the two panels to entrain air from the wing by virtue of the two panels constituting an ejector.

The two panels may be in the form of two flaps supported for pivotal motion relative to the jet pipe and to a fixed part of the wing so that the direction of the jet and of the entrained air may be varied for the purpose of varying the direction of thrust of the engine, e.g. in a forward and upward direction, while simultaneously increasing the lift of the wing.

The invention is particularly of use in aircraft where thrust line of the engine is offset from the center of gravity of the aircraft and where the additional lift derivable from the panel or panels in the trailing edge region of the wing can be of help in compensating for pitch unbalance occasioned by said offset.

The entrainment of air by said ejector not only increases the lift of the wing but also adds to the thrust developed at the exhaust end portion of the jet pipe.

An example of the present invention will now be described with reference to the accompanying drawings wherein.

Figure 1:
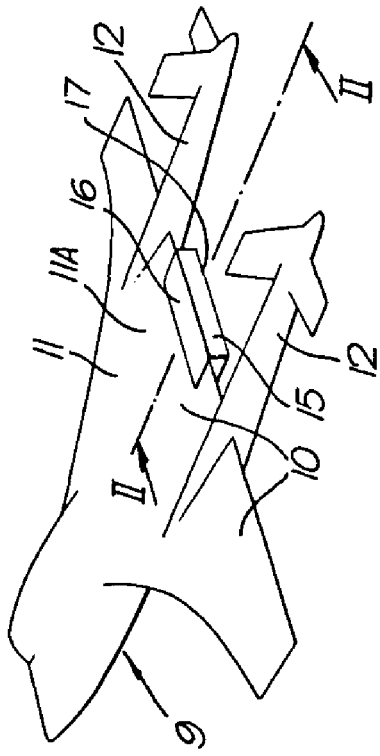
FIG. 1 is a perspective view of an aircraft.

Referring to FIG. 1, the aircraft 9, comprises a wing 10 including fixed structure 11 defining a lifting surface 11A extending between two tail booms 12. A gas turbine engine 13 installed beneath the structure 11 has a jet pipe 14 having an exhaust end portion being a nozzle 15 which has a rectangular flow area defined between an upper wall 16, a lower wall 17, and end walls 18. The walls 16,17 each comprise panels having the form of pivotal flaps to be described below.

Figure 2:
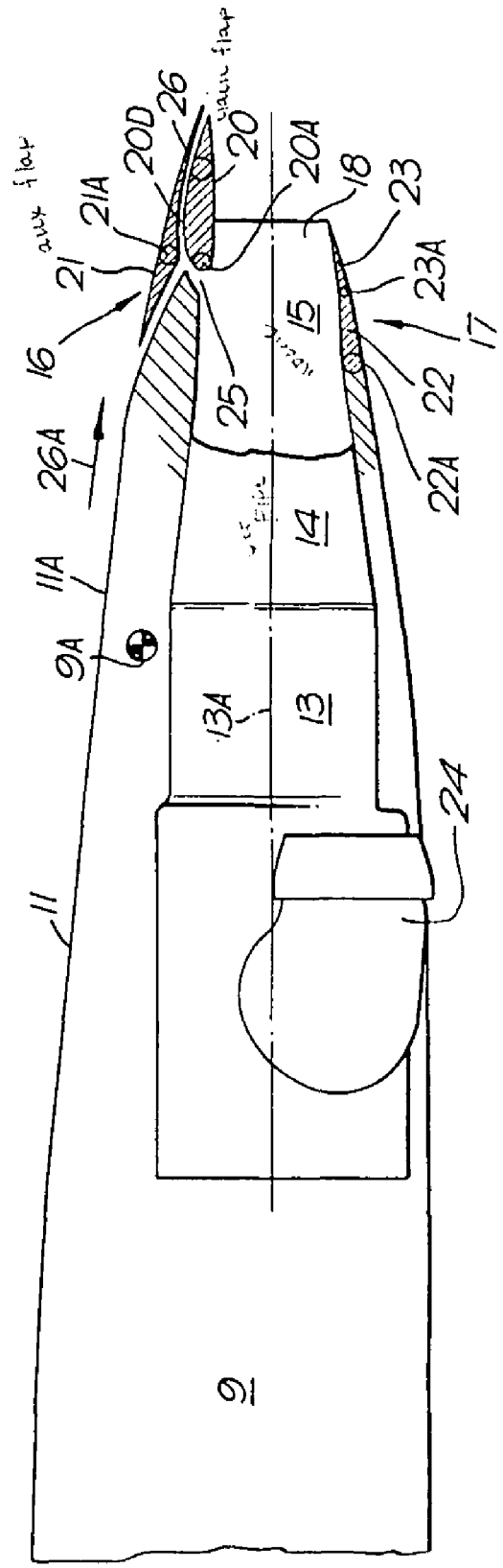
FIG. 2 is an enlarged section on the line II-II in FIG. 1.

Referring to FIG. 2, the wall 16 comprises a main upper flap 20 and an auxiliary flap 21 situated there-above. The flap 20 is supported on the structure 11 for pivotal movement about an axis 20A at the upstream edge of the flap 20. The flap 21 is supported on the structure 11 for pivotal movement about an axis 21A intermediate between the upstream and downstream edges of this flap. The lower wall 17 comprises two flaps 22,23 supported on the jet pipe 14 for pivotal movement about axes 22A,23A at their respective upstream ends. In normal wing-borne flight, when the thrust of the engine is required to be in the direction of the then substantially horizontal main axis 13A, the flaps 20,21,22,23 lie substantially in the direction of the axis 13A and form smooth continuations of the jet pipe 14 and, in the case of the flap 21, a smooth continuation of the surface 11A.

Figure 4:
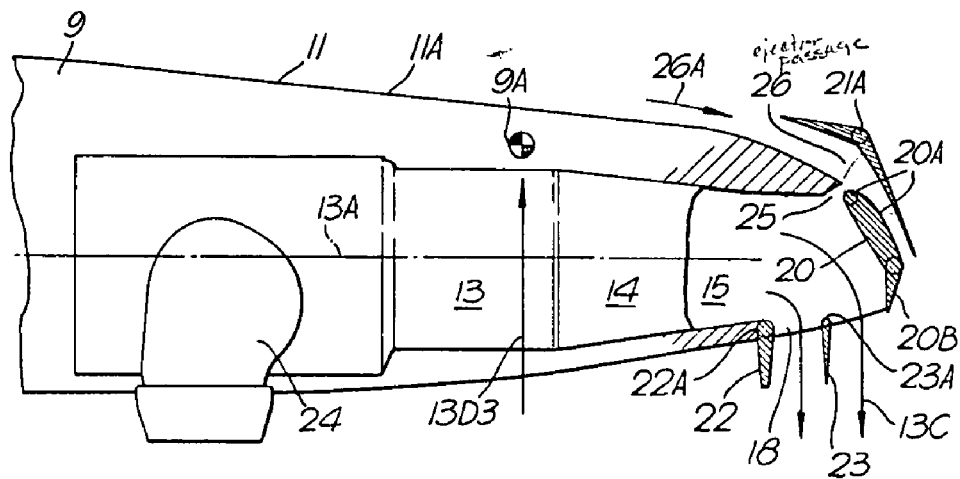

When it is required to divert the thrust of the engine into a vertical direction for purposes of a vertical take-off (FIG. 4) the flaps 20,21,22,23 are pivoted into a downwardly extending attitude whereby the flaps 20,22,23 divert the flow as shown by arrows 13C. The flap 20 comprises an upstream part 20B and a downstream part 20C pivoted to the upstream part 20B so that the curvature necessary for the FIG. 4 position can be attained as shown. In addition to the nozzle 15, the engine has, forward of that nozzle, two further jet nozzles 24 (only one shown) for air from a low pressure compressor of the engine, this being well-known per se. In the FIG. 4 position, the nozzle 24 is pivoted similarly into a downwardly directed position. Hence the thrust of the engine occurs on a resultant 13D3, and the engine is arranged relative to the aircraft for that resultant to pass substantially through the centre of gravity 9A of the aircraft, this being desirable to avoid an undue pitching moment on the aircraft.

Figure 3:
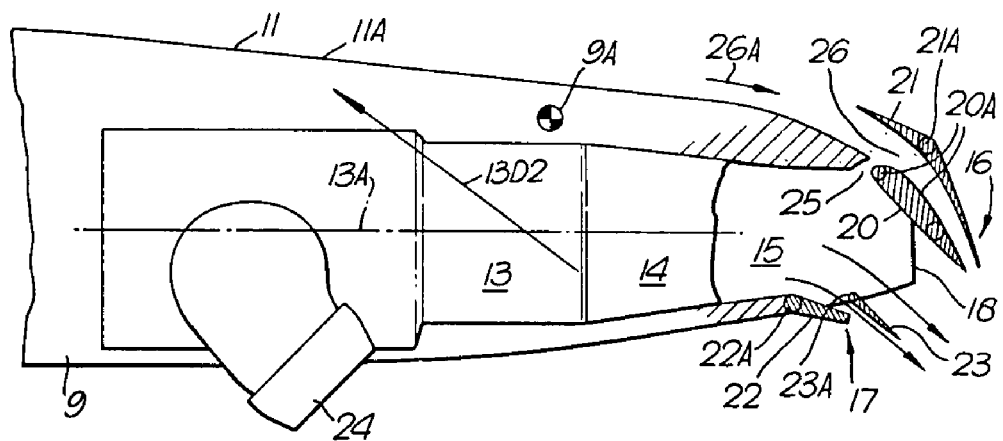
FIGS. 3 and 4 are similar to FIG. 2 but show different operational positions.

Assuming a vertical take-off has taken place, and it is then required to make a transition to normal forward flight, the flaps 20,21,22,23 are slowly pivoted into a position inclined to the horizontal, FIG. 3, when the thrust resultant has a vertical and a horizontal component, the latter component gradually increasing as the former component decreases so that, as the air-craft gathers forward speed, the support of the aircraft by engine thrust is progressively replaced by aerodynamic lift from the wing 10. In the inclined position of the flaps, the resultant, here denoted 13D2, passes forward of the centre of gravity 9A and so exerts a nose-up moment on the aircraft. This is balanced by lift derived from the upper panel 16 as will now be described.

The flap 16 is so related to the adjacent edge of the fixed structure 11, that, in the inclined and the vertically downward position of the flaps, the flap 16 is separated from the structure 11 by a passage 25 open to the jet pipe 14 and to an ejector passage 26 between the flaps 20,21. The passage 26 is formed by the flap 21 being displaced rearwards when being pivoted from the FIG. 2 position into the FIG. 3 or FIG. 4 positions. The passage 26 is open to air flow 26A over the surface 11A. The passage 25 is so shaped that the gases flowing therethrough are discharged along the upper surface 20D of the flap 20 at a speed greater than the speed of the flow 26A. Hence the latter flow is accelerated by being entrained into the passage 26 and the lift provided at the rear of the surface 11A is increased. This, in turn, helps to balance the nose-up moment mentioned above.

It will be appreciated that the passage 25,26 may also be open in the FIG. 2 position of the flap 16 to provide a measure of lift to balance the nose-up moment which occurs in this position inasmuch as the axis 13A, and thus the direction of thrust, lie below the center 9A.

Inasmuch as the panel is swept at its upper surface 20D by the entrained flow 26A, which is essentially boundary layer flow, and at its underside by the gas from the pipe 14, the panel may be regarded as a part common to the nozzle 15 and to the trailing edge portion of the wing 10 downstream of the fixed structure thereof. By constituting the flap 20 a common part in this way, it is possible to use the hot exhaust gas for the energization of the flow 26A because the passage 25 can be arranged substantially directly between the pipe 15 and the upper surface 20D and difficulties which might arise from the ducting of hot gas are avoided. While it is possible to use the gas for energization of the flow 26A in the FIG. 2 position, it is of particular advantage to do so in the FIG. 3 position for the reasons described. By being a part common to the nozzle 15 and the trailing edge portion of the wing, the flap 20 can be used simultaneously for energization of the flow 26A and for varying the direction of thrust.

We claim:

1. Aircraft with improved lift, comprising:
   a wing,
   a gas turbine engine having a jet pipe with an exhaust end portion situated beneath a trailing edge portion of the wing, the exhaust end portion being movable between a first position in which gas is exhausted substantially rearwardly from the jet pipe and a second position in which gas is exhausted from the jet pipe in a downward direction,
   a first panel common to said pipe end portion and the trailing edge portion of the wing, and
   a first flow passage arranged to connect the jet pipe to the upper surface of the panel to discharge exhaust gas of the engine over the panel and thereby accelerate air flowing from the wing toward the panel.

2. Aircraft according to claim 1, further comprising a second panel located above said first panel, said first and second panels forming between them a second passage into which flow from the first passage is discharged to entrain said air from the wing.

3. Aircraft according to claim 2, the engine having a main axis lying in the direction of normal wing-borne flight, said first and second panels being supported for pivotal motion relative to said jet pipe and said wing between a position of substantial alignment with the main axis and a position having an angle thereto, thereby to direct both the flow from the jet pipe and the flow from said second passage downwardly away from the direction of the main axis.

4. Aircraft according to claim 3, said jet pipe comprising a third panel supported on a side of the jet pipe opposite to the side of said jet pipe adjacent said wing, said third panel being supported on the jet pipe for pivotal motion together with said first and second panels and relative to the jet pipe between a position of substantial alignment with said main axis and a position at an angle thereto, thereby to accommodate the flow of gas directed from main axis by the first panel.

5. Aircraft according to claim 1, wherein said exhaust end portion of the jet pipe defines a rectangular flow area the longer sides of which lie along the trailing edge of said wing.

6. Aircraft according to claim 2, 3, 4 or 5, further comprising a downwardly pivotable jet nozzle for discharging air from a low pressure compressor of said gas turbine engine.

* * * * *